United States Patent
Choi

(10) Patent No.: US 9,581,683 B2
(45) Date of Patent: Feb. 28, 2017

(54) DELAY DEVICE FOR CHECKING FREQUENCY MODULATED CONTINUOUS WAVE (FMCW) RADAR

(71) Applicant: Jae Hyun Choi, Daejeon (KR)

(72) Inventor: Jae Hyun Choi, Daejeon (KR)

(73) Assignee: AGENCY FOR DEFENSE DEVELOPMENT (KR)

( * ) Notice: Subject to any disclaimer, the term of this patent is extended or adjusted under 35 U.S.C. 154(b) by 433 days.

(21) Appl. No.: 14/094,170

(22) Filed: Dec. 2, 2013

(65) Prior Publication Data
US 2014/0300509 A1    Oct. 9, 2014

(30) Foreign Application Priority Data
Mar. 5, 2013  (KR) .................... 10-2013-0023222

(51) Int. Cl.
*G01S 7/40* (2006.01)

(52) U.S. Cl.
CPC ..... *G01S 7/4056* (2013.01); *G01S 2007/4065* (2013.01)

(58) Field of Classification Search
CPC ........... G01S 7/4052; G01S 2007/4095; G01S 7/4056
USPC ........................................ 342/169–172, 200
See application file for complete search history.

(56) References Cited

U.S. PATENT DOCUMENTS

| | | | |
|---|---|---|---|
| 5,160,264 A * | 11/1992 | Banura ................. | G01S 7/4052 342/169 |
| 5,177,488 A | 1/1993 | Wang et al. ................. | 342/167 |
| 5,431,568 A * | 7/1995 | Fey ........................ | G01S 7/4052 342/169 |
| 5,457,463 A * | 10/1995 | Vencel .................. | G01S 7/4052 342/169 |
| 6,054,948 A * | 4/2000 | Dean ....................... | G01S 7/032 342/372 |

(Continued)

FOREIGN PATENT DOCUMENTS

KR    10-2011-0114795    10/2011

OTHER PUBLICATIONS

Office Action mailed May 8, 2013 in corresponding Korean Application No. 10-2013-0023222.

(Continued)

*Primary Examiner* — Marcus Windrich
(74) *Attorney, Agent, or Firm* — Ostrolenk Faber LLP

(57) ABSTRACT

The present disclosure relates to a delay device for checking a frequency modulated continuous wave (FMCW) radar, measuring a distance of a target and a relative velocity using microwaves and millimeter waves of a frequency modulated continuous waveform, and may include an input/output unit that is configured to input or output a control setting value, a controller that is configured to output a control signal corresponding to the control setting value input by an operator through the input/output unit, and a transceiver that is configured to delay an FMCW radar signal, for output, by a time delay corresponding to a distance of a target through a programmable single chip delay line according to the control signal of the controller, and configured to shift a frequency of the time-delayed FMCW radar signal by a Doppler frequency, and attenuate the frequency-shifted FMCW radar signal for output.

7 Claims, 3 Drawing Sheets

(56) References Cited

U.S. PATENT DOCUMENTS

| | | | | |
|---|---|---|---|---|
| 7,327,308 B2 * | 2/2008 | Cheng | ............... | G01S 7/4056 342/101 |
| 2004/0012517 A1 * | 1/2004 | Abou-Jaoude | ........ | G01S 7/4052 342/165 |
| 2006/0244654 A1 * | 11/2006 | Cheng | ............... | G01S 7/4056 342/165 |
| 2008/0088503 A1 | 4/2008 | Beasley | ..................... | 342/200 |
| 2009/0058716 A1 * | 3/2009 | Thomas | ............ | G01S 7/4052 342/172 |
| 2010/0109940 A1 * | 5/2010 | Williams | ........... | G01S 7/4052 342/171 |

OTHER PUBLICATIONS

Notice of Allowance mailed Jul. 4, 2013 in corresponding Korean Application No. 10-2013-0023222.

* cited by examiner

//DELAY DEVICE FOR CHECKING FREQUENCY MODULATED CONTINUOUS WAVE (FMCW) RADAR

CROSS-REFERENCE TO RELATED APPLICATION

Pursuant to 35 U.S.C. §119(a), this application claims the benefit of earlier filing date and right of priority to Korean Application No. 10-2013-0023222, filed on Mar. 5, 2013, the contents of which is incorporated by reference herein in its entirety.

BACKGROUND OF THE DISCLOSURE

1. Field of the Disclosure

This specification relates to a delay device for checking a frequency modulated continuous wave (FMCW) radar, measuring a distance of a target and a relative velocity using microwaves and millimeter waves of a frequency modulated continuous waveform.

2. Background of the Disclosure

In general, a frequency modulated continuous wave (FMCW) radar is used for a radio altimeter, a proximity sensor, a sensor for preventing collision of vehicle and aircraft, an autonomous intelligent cruise control (AICC), an industrial level gauge, imaging, an indoor presence detection, and the like, to measure a distance and velocity of a target to be monitored.

The FMCW radar serves to change a frequency on a time basis using a frequency modulation. The FMCW radar may compute a distance and a relative velocity of a target by extracting an intermediate frequency $f_{if}$ (Hz), which is a difference frequency $|f_t-f_r|$ between a transmission signal $f_t$ transmitted to the target and a return signal $f_r$.

In order to check the FMCW radar, a virtual reception signal with time delayed as long as a specific distance from the target, has to be generated and applied to the FMCW radar.

FIG. 1 is a configuration view of a transceiver of a delay device for checking an FMCW radar using an RF frequency cable according to the related art.

In the related art, a plurality of radio frequency (RF) cables have been used to generate a time delay corresponding to a distance of a target. For example, referring to FIG. 1, when 6 RF cables 130 to 135 are combined with 12 RF switches 110 to 121, totally 6 bits ($2^6$), namely, 64 types of time delays may be generated.

However, when the RF cable extends, a cable loss may be increased. To compensate for the cable loss, there may be a need for a loss compensator including amplifiers 141 and 143 and a variable attenuator 142. Since different losses result from the 64 types of time delays, the variable attenuator 142 and the amplifiers 141 and 143 should be controlled separately.

Also, the RF cable has a property that the cable loss is drastically increased when volume and frequency thereof are increased. Hence, the RF cable may be inefficient when generating a time delay for a relatively remote target.

FIG. 2 is a configuration view of a transceiver of a delay device for checking an FMCW radar using an optical cable according to the related art.

As illustrated in FIG. 2, for a remote target, optical cables with a less loss and a small volume are used. As one example, when a delay device for checking an FMCW radar is configured by a combination of 6 optical cables 240 to 245 and 12 optical switches 220 to 231, the device has a cable loss less than the delay device illustrated in FIG. 1 but needs an E/O-O/E converter 210, 250 and a loss compensator 260 including an amplifier 261 and a variable attenuator 262. Specifically, the converter and the optical switches require for high costs.

As described above, the related art delay device needs a large number of delay cables, switches, amplifiers and converters to generate the time delay. Accordingly, the implementation of the device may be complicated and a fabricating cost thereof may thus increase.

SUMMARY OF THE DISCLOSURE

Therefore, an aspect of the detailed description is to provide a delay device for checking an FMCW radar, capable of easily accurately varying distance information related to an FMCW radar signal, as a target to be checked, with low costs.

To achieve these and other advantages and in accordance with the purpose of this specification, as embodied and broadly described herein, there is provided a delay device for checking a frequency modulated continuous wave (FMCW) radar, the device including an input/output unit that is configured to input or output a control setting value, a controller that is configured to output a control signal corresponding to the control setting value input by an operator through the input/output unit, and a transceiver that is configured to delay an FMCW radar signal, for output, by a time delay through a programmable single chip delay line according to the control signal of the controller, the time delay corresponding to a distance of a target, The transceiver may shift a frequency of the time-delayed FMCW radar signal by a Doppler frequency, and attenuate the frequency-shifted FMCW radar signal for output.

The control setting value input by the operator may include a time delay value corresponding to the distance of the target, a Doppler frequency corresponding to a relative velocity with the target, and a variable attenuation value corresponding to a magnitude of a signal of the target.

The transceiver may down-convert the FMCW radar signal into a non-modulated baseband signal, and delay the down-converted FMCW radar signal through a programmable delay line as a single chip.

The transceiver may include a reference clock signal generator that is configured to generate a reference clock signal, a down-converter that is configured to down-convert the FMCW radar signal according to the reference clock signal, a delay discriminator that is configured to down-convert the down-converted FMCW radar signal into a baseband signal, a programmable delay line that is configured to delay the FMCW radar baseband signal therethrough according to the time delay value input by the operator, a single sideband up-converter that is configured to up-convert the time-delayed FMCW radar baseband signal only in a single sideband according to the reference clock signal, an I/Q modulator that is configured to shift the up-converted FMCW radar signal in the single sideband by the Doppler frequency input by the operator, a variable attenuator that is configured to attenuate the FMCW radar signal shifted by the Doppler frequency using the attenuation value input by the operator, and an up-converter that is configured to execute an up-conversion by mixing the attenuated FMCW radar signal with an output signal of the down-converter.

The delay discriminator may include an amplifier that is configured to amplify an output signal of the down-converter, and a down-converter that is configured to mix the output signal of the down-converter and an output signal of the amplifier with each other.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of preferred configurations of a delay device according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Figure 3:
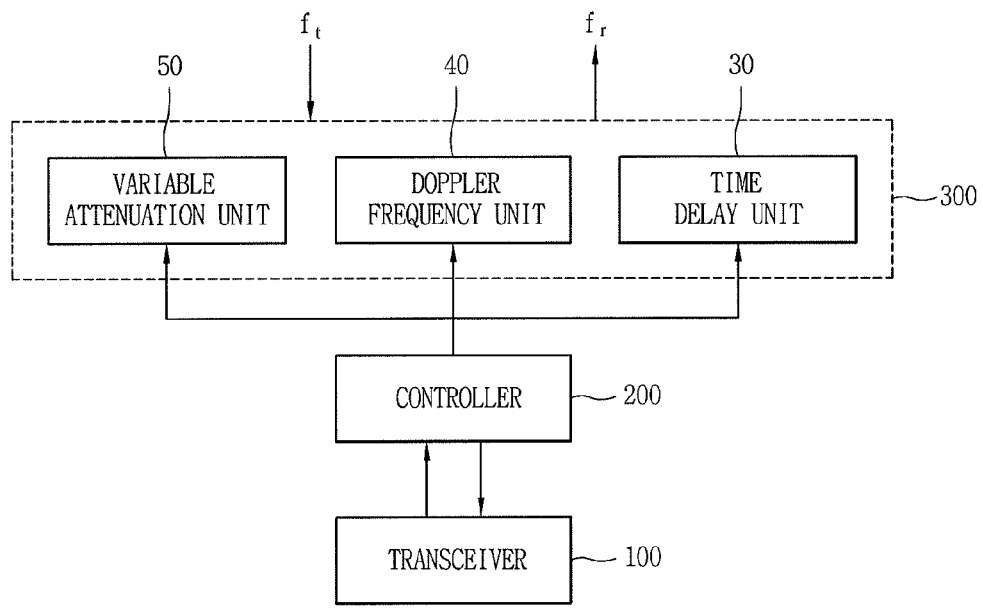
FIG. 3 is a block diagram of a delay device for checking an FMCW radar in accordance with an exemplary embodiment of the present disclosure.

FIG. 3 is a block diagram of a delay device for checking an FMCW radar in accordance with an exemplary embodiment of the present disclosure.

As illustrated in FIG. 3, a delay device for checking an FMCW radar in accordance with an exemplary embodiment may include an input/output unit 100 that allows an operator to input or output control setting values, a controller 200 that is configured to output a control signal corresponding to the control setting values input through the input/output unit 100, and a transceiver 300 that is configured to time-delay a transmission signal transmitted from the FMCW radar according to the control signal of the controller 200, shift a frequency by a Doppler frequency, and attenuate a magnitude of the signal for output.

The control setting values may include a time delay value corresponding to a distance of a target, a Doppler frequency corresponding to a relative velocity with the target, and a (variable) attenuation value corresponding to a magnitude of a signal of the target.

The transceiver 300 may include a time delay unit 30 to time-delay the signal transmitted from the FMCW radar, a Doppler frequency unit 40 to shift a frequency of an output signal of the time delay unit 30 by a Doppler frequency, and a variable attenuation unit 50 to attenuate a magnitude of the frequency-shifted signal.

An operator may use the time delay value, the Doppler frequency and the variable attenuation value as control factors. When the operator inputs the time delay value, the Doppler frequency and the variable attenuation value through the input/output unit 100, the controller 200 may transmit a control signal to the transceiver 300 to control each of the time delay unit 30, the Doppler frequency unit 40 and the variable attenuation unit 50 within the transceiver 300.

Therefore, the transceiver 300 may receive the signal $f_t$ transmitted from the FMCW radar, and delay the signal by the time delay value corresponding to the distance of the target. Afterwards, the transceiver 300 may shift the delayed signal by the Doppler frequency corresponding to a relative velocity with the target, attenuate a magnitude of the frequency-shifted signal by the attenuation value, so as to generate a reception signal $f_r$. That is, the delay device for checking the FMCW radar may check the performance of the FMCW radar to be checked, in extracting the distance and the relative velocity of the target.

Hereinafter, description will be given in more detail of an operation of the delay device for checking the FMCW radar according to the exemplary embodiment.

Figure 4:
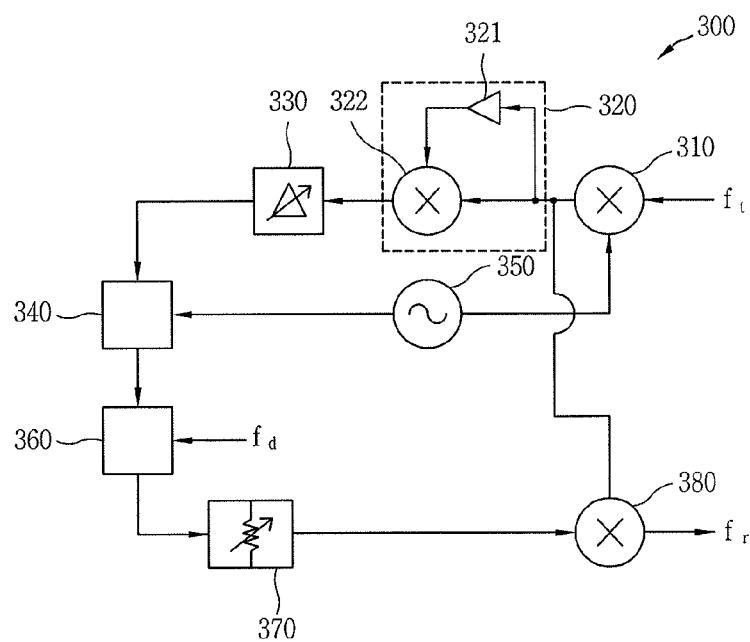
FIG. 4 is a configuration view of the transceiver of the delay device for the FMCW radar in accordance with the exemplary embodiment of the present disclosure.

FIG. 4 is a detailed configuration view of the transceiver 300 illustrated in FIG. 3.

As illustrated in FIG. 4, the transceiver 300 may include a reference clock signal generator 350 to generate a reference clock signal, a down-converter 310 to down-convert an FMCW radar signal according to the reference clock signal, a time delay discriminator 320 to convert the down-converted FMCW radar signal into a baseband signal, a programmable delay line 330 to delay the FMCW radar baseband signal therethrough according to a time delay value input by an operator, a single sideband up-converter 340 to up-convert the time-delayed FMCW radar baseband signal only in a single sideband, an I/Q modulator 360 to shift the up-converted FMCW radar signal only in the single sideband by a Doppler frequency input by the operator, a variable attenuator 370 to attenuate the FMCW radar signal, shifted by the Doppler frequency, by an attenuation value input by the operator, and an up-converter 380 to mix the attenuated FMCW radar signal with an output signal of the down-converter 310 and up-convert the mixed signal.

A detailed configuration of the transceiver 300 illustrated in FIG. 4 may correspond to the time delay unit 30, the Doppler frequency unit 40, and the variable attenuation unit 50.

That is, the time delay unit 30 of FIG. 3 may include the reference clock signal generator 350, the down-converter 310, the delay discriminator 320, the programmable delay line 330, and the up-converter 340. The Doppler frequency unit 40 may include the I/Q modulator 360. Also, the variable attenuation unit 50 may include the variable attenuator 370 and the up-converter 380. The configuration is merely illustrative, and the present disclosure may not be limited to the configuration.

The delay discriminator 320 may include an amplifier 321 to amplify an output signal of the down-converter 310, and a down-converter 322 to mix the frequency of the output signal of the down-converter 310 with a frequency of an output signal of the amplifier 311.

The down-converter 310 may receive the transmission signal $f_t$ from the FMCW radar and a reference clock signal which has been output from the reference clock signal generator 350, and output a difference frequency element of the two signals, namely, the down-converted FMCW radar signal.

The down-converted FMCW radar signal may be input into the delay discriminator 320. The input signal of the delay discriminator 320 is the down-converted FMCW radar signal. Hence, a beat signal, which corresponds to a time difference between paths of two signals input to the down-converter 322, may be output from the delay discriminator 320. The output signal of the delay discriminator 320 may be a non-modulated baseband signal. Hence, an output frequency of the delay discriminator 320 may be adjusted by adjusting the time difference between the two paths.

Figure 1:
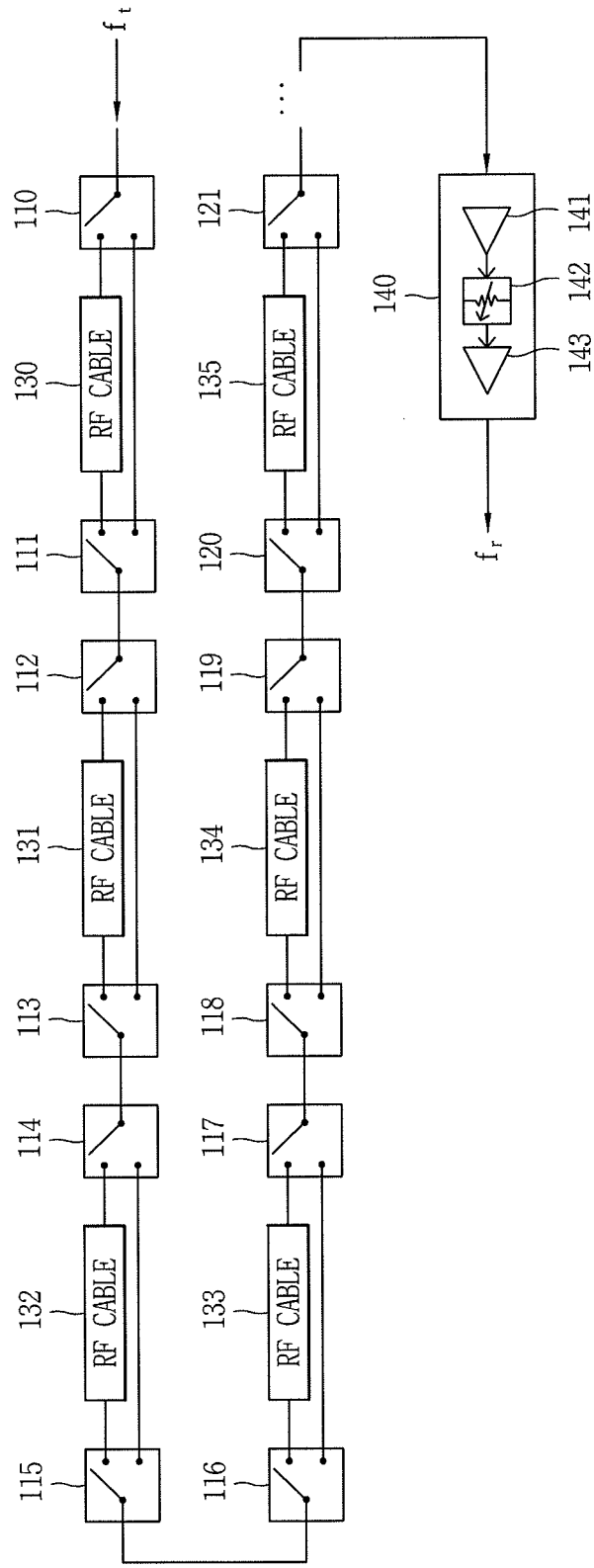
FIG. 1 is a configuration view of a transceiver of a delay device for checking an FMCW radar using an RF frequency cable according to the related art.
Figure 2:
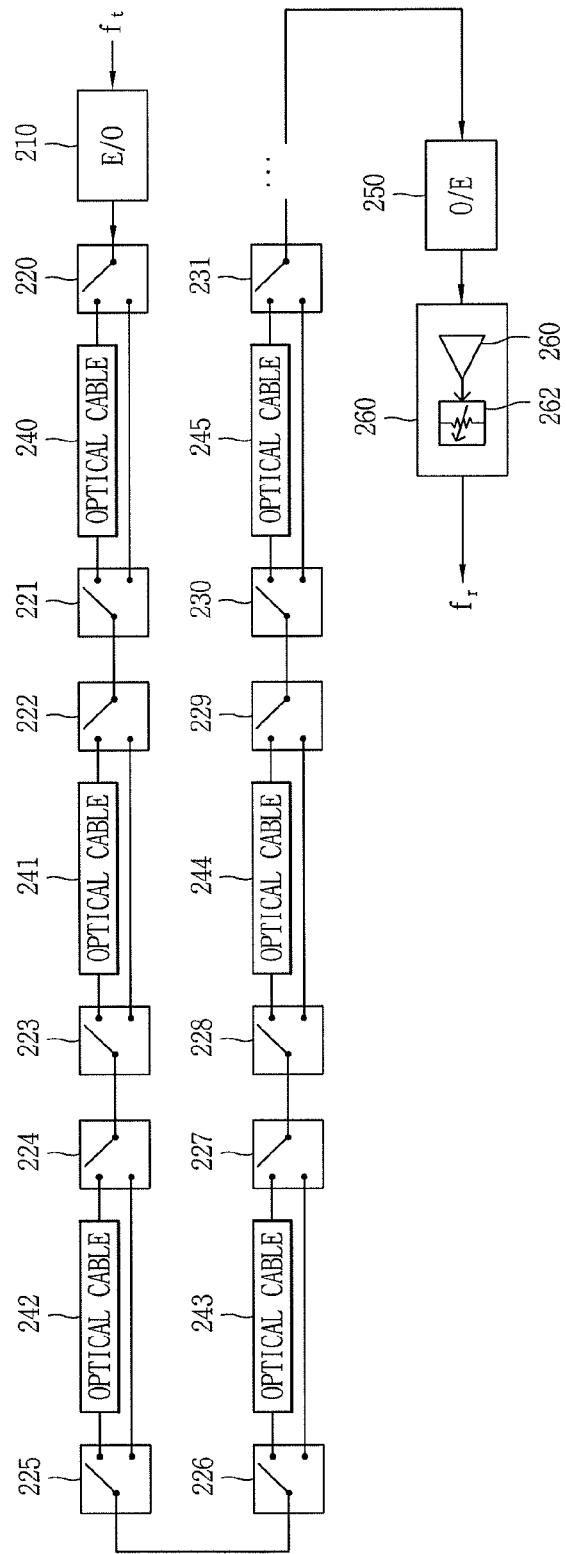
FIG. 2 is a configuration view of a transceiver of a delay device for checking an FMCW radar using an optical cable according to the related art.

The output signal of the delay discriminator 320 may be time-delayed by being input into the programmable delay line 330, and the delay time may be controlled according to a time delay value input by the operator through the input/output unit 100 and the controller 200. Here, the input signal of the programmable delay line 330 may be converted into a low frequency signal of the baseband because an input frequency of the programmable delay line 330 as a commonly-used signal chip is low. Also, the use of the programmable delay line 330 may bring about implementation of a delay time in a very easy and accurate manner with a low cost, as compared with the related art illustrated in FIGS. 1 and 2.

The time-delayed signal by the programmable delay line 330 may be input into the up-converter 340. The up-converter 340 may execute an up-conversion by adding the frequency of the time-delayed signal to the frequency of the reference clock signal output from the reference clock signal generator 350, and output the up-converted signal to the single sideband up-converter 340.

Here, the up-conversion of the time-delayed output signal of the baseband frequency of the programmable delay line 330 may be executed such that the up-converted signal can belong to an input frequency range of the commonly-used I/Q modulator 360, which is generally used for Doppler frequency shifting. Also, by down-converting the transmission signal $f_t$ of the FMCW radar signal in the down-converter 310 and then up-converting the down-converted signal in the single sideband up-converter 340 using the single reference clock signal generator 350, phase noise and frequency drift caused due to use of an additional signal generator, which may be caused in the transceiver 300, may be avoided by correlation during the down-up frequency conversion process.

The output signal of the single sideband up-converter 340 may be input to the I/Q modulator 360. The I/Q modulator 360 may combine the output signal of the single sideband up-converter 340 with a Doppler signal $f_d$, and shift the output signal of the single sideband up-converter 340 by the frequency of the Doppler signal. Here, the Doppler signal $f_d$ may also be controlled by the operator through the input/output unit 100 and the controller 200.

The output signal of the I/Q modulator 360 may be input into the variable attenuator 370. The variable attenuator 370 may attenuate the output signal of the I/Q modulator 360 according to an attenuation value input by the operator through the input/output unit 100 and the controller 200. Here, the variable attenuator 370 may be used to control a magnitude of the signal of the target.

The output signal of the variable attenuator 370 may be input into the up-converter 380. The up-converter 380 may combine an output signal of the variable attenuator 370 with the down-converted transmission signal $f_t$ of the FMCW radar, as the output signal of the down-converter 310, thereby outputting a reception signal $f_r$ modulated to FMCW. Here, the output signal of the variable attenuator 370 may be a non-modulated signal of a single frequency, and the final output signal $f_r$ of the transceiver 300 may be a modulated signal into an FMCW.

As described above, a delay device for checking an FMCW radar according to the present disclosure may vary a time delay corresponding to a distance of a target through a programmable delay line. Accordingly, the delay device may be implemented with low costs and distance information related to an FMCW radar signal as the target to be checked may be varied easily and accurately.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A delay device for checking a frequency modulated continuous wave (FMCW) radar, comprising:
   an input/output unit that is configured to input or output control setting values;
   a controller that is configured to output control signals corresponding to the control setting values input by an operator through the input/output unit;
   wherein the control setting values include a time delay value corresponding to the distance of the target, a Doppler frequency corresponding to a relative velocity with the target, and a variable attenuation value corresponding to a magnitude of a signal of the target; and
   a transceiver that is configured to delay an FMCW radar signal by the time delay value through a programmable single chip delay line according to the control signal of the controller, and transmit the time-delayed FMCW radar signal to a FMCW radar,
   wherein the transceiver is further configured to shift a frequency of the time-delayed FMCW radar signal by the Doppler frequency, and attenuate the frequency-shifted FMCW radar signal by the variable attenuation value,
   wherein the time delay value, the Doppler frequency value and the attenuation value are variable in response to an input of an operator.

2. The device of claim 1, wherein the transceiver controls a time delay, a Doppler frequency and a variable attenuation for the FMCW radar signal according to the control signal of the controller.

3. The device of claim 1, wherein the transceiver comprises:
   a reference clock signal generator that is configured to generate a reference clock signal;

a down-converter that is configured to down-convert the FMCW radar signal according to the reference clock signal;

a delay discriminator that is configured to down-convert the down-converted FMCW radar signal into a baseband signal;

a programmable delay line that is configured to delay the FMCW radar baseband signal according to the time delay value input by the operator;

a single sideband up-converter that is configured to up-convert the time-delayed FMCW radar baseband signal only in a single sideband according to the reference clock signal;

an I/Q modulator that is configured to shift the up-converted FMCW radar signal in the single sideband by the Doppler frequency input by the operator;

a variable attenuator that is configured to attenuate the FMCW radar signal shifted by the Doppler frequency using the attenuation value input by the operator; and an up-converter that is configured to execute an up-conversion by combining the attenuated FMCW radar signal and an output signal of the down-converter, wherein the delay discriminator includes a first path for amplifying an output signal of the down-converter and a second path for delivering the output signal of the down-converter, and wherein the delay discriminator adjusts a frequency of the down-converted FMCW radar signal by a time difference between the first and second paths and outputs a non-modulated baseband signal.

4. The device of claim 3, wherein the delay discriminator comprises:

an amplifier that is configured to amplify an output signal of the down-converter; and a down-converter that is configured to mix the output signal of the down-converter and an output signal of the amplifier with each other.

5. A delay device for checking a frequency modulated continuous wave (FMCW) radar, the device comprising:

an input/output unit that is configured to input or output a control setting value;

a controller that is configured to output a control signal corresponding to the control setting value input by an operator through the input/output unit; the control setting value including a time delay value, a Doppler frequency value and a variable attenuation value;

a time delay unit that is configured as a programmable single chip delay line to delay an FMCW radar signal by the time delay value corresponding to the distance of the target;

a Doppler frequency unit that is configured to shift a frequency of the FMCW radar signal, delayed by the time delay unit, by the Doppler frequency corresponding to a relative velocity with the target; and a variable attenuation unit that is configured to attenuate a magnitude of the frequency-shifted FMCW radar signal by the variable attenuation value corresponding to a magnitude of a signal of the target and transmit the time-delayed FMCW radar signal to the an FMCW radar, wherein the time delay unit comprises:

a down-converter that is configured to down-convert the FMCW radar signal according to a first reference clock signal;

a delay discriminator that is configured to down-convert the down-converted FMCW radar signal into a baseband signal;

a programmable delay line that is configured to delay the FMCW radar baseband signal therethrough according to the time delay value input by the operator; and a single sideband up-converter that is configured to up-convert the time-delayed FMCW radar baseband signal only in a single sideband according to a second reference clock signal, wherein the delay discriminator includes a first path for amplifying an output signal of the down-converter and a second path for delivering the output signal of the down-converter, wherein the delay discriminator adjusts a frequency of the down-converted FMCW radar signal by a time difference between the first and second paths and outputs a non-modulated baseband signal, and wherein the first and the second reference clock signal are outputted from a single reference clock signal generator.

6. The device of claim 5, wherein the Doppler frequency unit comprises:

an I/Q modulator that is configured to shift the up-converted FMCW radar signal in a single sideband by the Doppler frequency input by the operator.

7. The device of claim 5, wherein the variable attenuation unit comprises:

a variable attenuator that is configured to attenuate the FMCW radar signal shifted by the Doppler frequency by the attenuation value input by the operator; and an up-converter that is configured to execute an up-conversion by combining the attenuated FMCW radar signal and an output signal of the down-converter.

* * * * *